United States Patent
Cohen et al.

(10) Patent No.: US 7,778,487 B2
(45) Date of Patent: Aug. 17, 2010

(54) REGION SELECTION FOR IMAGE COMPOSITING

(75) Inventors: Michael Cohen, Seattle, WA (US); Matthew T. Uyttendaele, Seattle, WA (US); R. Alex Colburn, Renton, WA (US)

(73) Assignee: Microsoft Corp., Redmond, WA (US)

( * ) Notice: Subject to any disclaimer, the term of this patent is extended or adjusted under 35 U.S.C. 154(b) by 935 days.

(21) Appl. No.: 11/561,407

(22) Filed: Nov. 19, 2006

(65) Prior Publication Data

US 2008/0120560 A1    May 22, 2008

(51) Int. Cl.
    *G06K 9/36*    (2006.01)
(52) U.S. Cl. ..................................... 382/284
(58) Field of Classification Search ................ 382/284
    See application file for complete search history.

(56) References Cited

U.S. PATENT DOCUMENTS

| | | | |
|---|---|---|---|
| 6,075,905 A * | 6/2000 | Herman et al. | 382/284 |
| 6,226,105 B1 | 5/2001 | Fukushi | |
| 6,339,763 B1 | 1/2002 | Divine et al. | |
| 6,549,679 B1 | 4/2003 | Zheng | |
| 6,895,127 B1 | 5/2005 | Zheng | |
| 6,912,293 B1 * | 6/2005 | Korobkin | 382/100 |
| 2002/0181762 A1* | 12/2002 | Silber | 382/154 |
| 2003/0043274 A1 | 3/2003 | Gentile | |
| 2004/0022435 A1 | 2/2004 | Ishida | |
| 2004/0250205 A1 | 12/2004 | Conning | |
| 2005/0080670 A1 | 4/2005 | Kehoe | |
| 2006/0023077 A1 | 2/2006 | Alton et al. | |

FOREIGN PATENT DOCUMENTS

WO    WO2006018601    2/2006

OTHER PUBLICATIONS

Akers, D., F. Losasso, J. Klingner, M. Agrawala, J. Rick and P. Hanrahan, Conveying shape and features with image-based relighting, *IEEE Visualization*, 2003, pp. 349-354.
Boykov, Y., O. Veksler, and R. Zabih, Fast approximate energy minimization via graph cuts, *IEEE Transactions on Pattern Analysis and Machine Intelligence*, vol. 23, No. 11, 2001, pp. 1222-1239.

(Continued)

*Primary Examiner*—Vu Le
*Assistant Examiner*—Tsung-Yin Tsai
(74) *Attorney, Agent, or Firm*—Lyon & Harr, LLP; Katrina A. Lyon (57) ABSTRACT

A technique for image compositing which allows a user to select the best image of an object, such as for example a person, from a set of images interactively and see how it will be assembled into a final photomontage. A user can select a source image from the set of images as an initial composite image. A region, representing a set of pixels to be replaced, is chosen by the user in the composite image. A corresponding same region is reflected in one or more source images, one of which will be selected by the user for painting into the composite image. The technique optimizes the selection of pixels around the user-chosen region or regions for cut points that will be least likely to show seams where the source images are merged in the composite image.

13 Claims, 5 Drawing Sheets

OTHER PUBLICATIONS

Burt, P., and R. Kolczynski, Enhanced image capture throught fusion, *Int'l Conf. on Comp. Vision*, 1993, pp. 173-182.

Davis, J., Mosaics of scenes with moving objects, *Comp. Vision and Pattern Recognition*, 1998, pp. 354-360.

Fattal, R., D. Lischinski, and M. Werman, Gradient domain high dynamic range compression, *ACM Transactions on Graphics*, 2002, vol. 21, No. 3, pp. 249-256.

Freeman, W. T., and H. Zhang, Shape-time photography, *Conf. on Comp. Vision and Pattern Recognition*, 2003, pp. 151-157.

Haeberli, P., *Graphica Obscura web site*, 2003, http://www.sgi.com/grafica.

Kwatra, V., A. Schödl. I. Essa. G. Turk, and A. Bobick, Graphcut textures: Image and video synthesis using graph cuts, *ACM Transactions on Graphics*, 2003, vol. 22, No. 3, pp. 277-286.

Levin, A., A. Zomet, S. Peleg, and Y. Weis, Seamless image stitching in the gradient domain, *European Conf. on Comp. Vision*, 2004, vol. 4, pp. 377-389.

Lucas, B. D., T. Kanade, An interactive image registration technique with an application to stereo vision, *Proceedings of the 7th Int'l Joint Conf. on Artificial Intelligence*, 1981, pp. 674-679.

Massey, M., and W. Bender, Salient stills: Process and practice, *IBM Systems Journal*, 1996, vol. 35, No. 3 & 4, pp. 557-574.

Mortensen, E. N., and W. A. Barrett. Intelligent scissors for image composition, *Proceedings of SIGGRAPH 95, Computer Graphics Proceedings, Annual Conference Series*, 1995, pp. 191-198.

Pérez, P., M. Gangnet, and A. Blake, Poisson image editing, *ACM Transactions on Graphics*, 2003, vol. 22, No. 3, pp. 313-318.

Raskar, R., A. Ilie, and J. Yu, Image fusion for context enhancement and video surrealism, *NPAR 2004: Third Int'l Symposium on Non-Photorealistic Rendering*, Jun. 7-9, 2004, pp. 85-94.

Reinhard, E., M. Stark, P. Shirley, and J. Ferwerda, Photographic tone reproduction for digital images, *ACM Transactions on Graphics*, 2002, vol. 21, No. 3, pp. 267-176.

Szeliski, R., and H.-Y. Shum, Creating full view panoramic mosaics and environment maps, *Computer Graphics Proceedings, Annual Conference Series*, 1997, pp. 251-258.

Uyttendaele, M., A. Eden, and R. Szeliski, Eliminating ghosting and exposure artifacts in image mosaics, *Conf. on Comp. Vision and Pattern Recognition*, 2001, pp. 509-516.

Weiss, Y., Deriving intrinsic images from image sequences, *Int'l Conf. on Computer Vision*, 2001, pp. 68-75.

* cited by examiner

REGION SELECTION FOR IMAGE COMPOSITING

BACKGROUND

Background Art

Digital cameras are becoming popular and their sales have increased rapidly in recent years. Since digital cameras have become so popular, there has been an increased desire to share the photos taken with these cameras between family members, friends and coworkers. Business use of these images has also increased dramatically. Digital images are frequently used in marketing materials, technical papers, reports and Internet websites.

An aspect of digital image sharing is the quality of the images shared and used in various applications. People often seek to improve images themselves or collaboratively with others. Image-editing software, that improves the quality of digital images, has therefore also become quite popular. Digital images can be edited in a wide variety of ways using photo-editing software. In some cases an editing program is used to improve an image by eliminating or reducing its flaws.

One important aspect of digital photography is capturing images of a group of people, such as, for example, a family photo or an image of a sports team. Taking group photographs can be frustrating because capturing a single image in which everyone is smiling and has their eyes open is nearly impossible. Most photographers take a series of photographs hoping to capture at least one satisfactory image of the group. However, this approach may never yield such an image. On the other hand, within the series of images, it is likely that at least one good image of each individual within the group will be captured. To resolve such a problem, there are systems that can create a group photograph by combining the best portions of a series of individual images into a single composite image that incorporates the best view of each person in the group. It has been difficult, in the past, however, to accurately select the image portions of the series of images to create the best composite image without the composite image showing artifacts or seams where images are stitched together to create the composite.

SUMMARY

The present image region selection technique for image compositing overcomes the aforementioned limitations in systems for creating digital images by allowing a user to select the best image of an object, such as for example a person's face, from a set of images interactively while seeing how it will be assembled into the final photomontage.

In one embodiment of the image region selection technique an image stack is employed. An image stack is a set of identically sized registered images (e.g., the same pixel in each image represents more or less the same thing) that may originate from any stationary still or video camera. One way to envision an image stack is as a three dimensional (3D) collection of pixels defined by a set of images (or a short video).

After selecting a base for a composite image from the image stack, a user can select a region of the composite image that they wish to replace with a corresponding region in another image, termed a source image, from the image stack. The set of pixels in the source image is copied to the user-selected region in the composite image. The present image region selection technique optimizes the selection of pixels around the user-chosen region or regions for cut points that will be least likely to show seams where images are merged to create the composite image. In one embodiment a graph cut optimization technique is used in determining the best cut points.

The User Interface (UI) of one exemplary embodiment of the present image region selection technique is designed to easily select the portions of the source image that are to be used in a composite image. The display includes a pane that displays the source images from the image stack. Additionally, the composite image is displayed. When the user selects a region to be replaced in the composite image, for example by drawing a box around the region, the corresponding region is displayed in each source image. The user then selects the source image whose region is to be used to replace the corresponding region in the composite image. An inner region of the region the user selects is protected from being cut in the compositing process.

It is noted that while the foregoing limitations in existing image compositing schemes described in the Background section can be resolved by a particular implementation of the present interactive image region selection technique, this is in no way limited to implementations that just solve any or all of the noted disadvantages. Rather, the present technique has a much wider application as will become evident from the descriptions to follow.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

1.0 The Computing Environment

Before providing a description of embodiments of the present interactive image region selection technique, a brief, general description of a suitable computing environment in which portions thereof may be implemented will be described. The present image region selection technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessorbased systems, set top boxes, programmable consumer electronics, network PCs, minicomputers, mainframe computers, distributed computing environments that include any of the above systems or devices, and the like.

Figure 1:
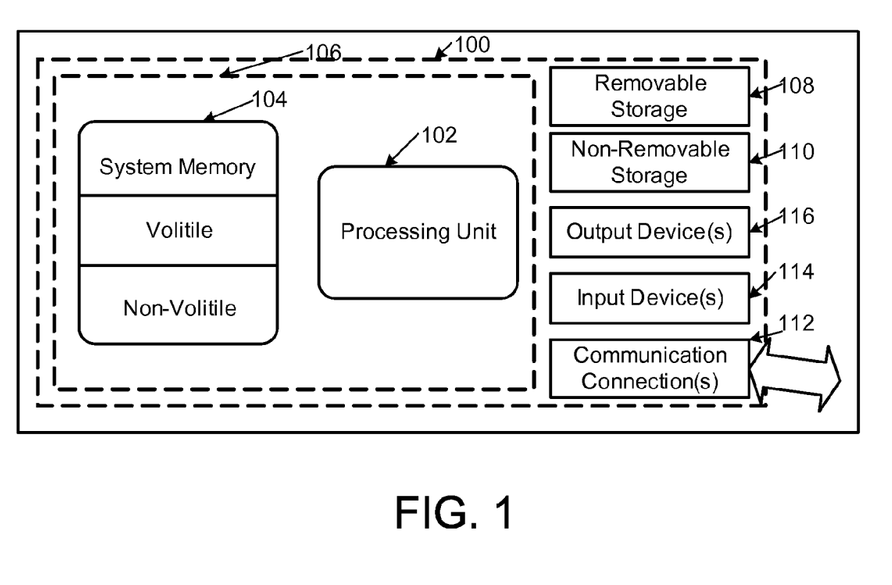
FIG. 1 is a diagram depicting a general purpose computing device constituting an exemplary system for a implementing a component of the present image region selection technique.

FIG. 1 illustrates an example of a suitable computing system environment. The computing system environment is only one example of a suitable computing environment and is not intended to suggest any limitation as to the scope of use or functionality of the present image region selection technique. Neither should the computing environment be interpreted as having any dependency or requirement relating to any one or combination of components illustrated in the exemplary operating environment. With reference to FIG. 1, an exemplary system for implementing the present image region selection technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, microphone, mouse, pen, voice input device, touch input device, and so on. Output device(s) 116 such as a display, speakers, a printer, and so on may also be included. All these devices are well know in the art and need not be discussed at length here.

Device 100 can include a camera as an input device 114 (such as a digital/electronic still or video camera, or film/photographic scanner), which is capable of capturing a sequence of images, as an input device. Further, multiple cameras could be included as input devices. The images from the one or more cameras are input into the device 100 via an appropriate interface (not shown). However, it is noted that image data can also be input into the device 100 from any computer-readable media as well, without requiring the use of a camera.

The present image region selection technique may be described in the general context of computer-executable instructions, such as program modules, being executed by a computing device. Generally, program modules include routines, programs, objects, components, data structures, etc. that perform particular tasks or implement particular abstract data types. The present image region selection technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present image region selection technique.

2.0 Region Selection for Image Compositing.

The following sections provide terminology associated with the present image region selection technique and exemplary working embodiments of the technique.

2.1 Terminology

The definition of some terminology may be useful in understanding the present image region selection technique. The present technique employs an image stack, source images, a composite image, a paint image and a label image.

2.1.1 The Image Stack.

An image stack is a set of identically sized registered images that may originate from any stationary still or video camera. The images in the image stack typically vary in one or more of the time they were taken, the lighting direction and amount, focus, exposure and/or camera position. If a stationary camera was not used to capture a set of images, the images may be registered by conventional techniques such as by manually aligning them or using an automated registration procedure. The image stack may be thought of as a 3D cube-like set of pixels I(x,y,z). For example, one way to envision an image stack is as a three dimensional (3D) collection of pixels defined by a set of images (or a short video). In the 3D pixel set, the normal X and Y dimensions define the coordinates of a single image. The Z (or time) dimension defines which image in the stack (or what point in time in a video). For example, position (78,259,7) would be the pixel at position (78,259) in the 7$^{th}$ frame or image (or slice) in the stack. At each (x,y), one may refer to a span of pixels over all values of z. A span of pixels is the set of all pixels at some (X, Y) location in all images of the image stack (e.g., pixel (47,83) in all images in the image stack for the example given above).

2.1.2 Composite Image

A composite image is created by combining elements from a series of photos of a single, changing scene—for example, creating a group portrait in which everyone looks their best, or creating new individual portraits from multiple input portraits. A composite image composites several source images. A one-to-one correspondence between the source image and the composite image is set up. The composite image is created by simply copying corresponding pixels from the source images to the composite. The choice of which source image to copy from, is guided by the label image which is discussed in greater detail below.

2.1.3 Source Image

A source image is an image that is used in creating the composite image. A source image can be an original image from the image stack or it can be an intermediate image that has been previously edited or composited.

2.1.4 Paint Image

A paint image is an image that specifies where an image should not be cut in creating the composite image. The paint image is based on regions specified by the user. The regions that are not to be cut are somewhat smaller than the regions specified by the user as the goal is to allow the optimization procedure the least constraints in determining the cut paths. The paint image is empty except inside regions corresponding to those defined by the user that contain the "label" (or index) of one of the source images not erased by subsequent interaction.

2.1.5 Label Image

Typically, the user goes through an iterative refinement process to create a composite image. Associated with the composite is a labeling, which is an array that specifies the source image for each pixel in the composite. A label image is an image wherein each pixel is labeled with a label specifying a source image. The label image is the result of an optimization process. That optimization process should do three things. It must agree with the paint image wherever a label has been specified. It needs to choose a label for every pixel. It should minimize visible artifacts in the final composite image. The optimization process operates on the whole label image, not just within the areas selected by the user

2.2 Image Region Selection Technique Architecture.

Figure 2:
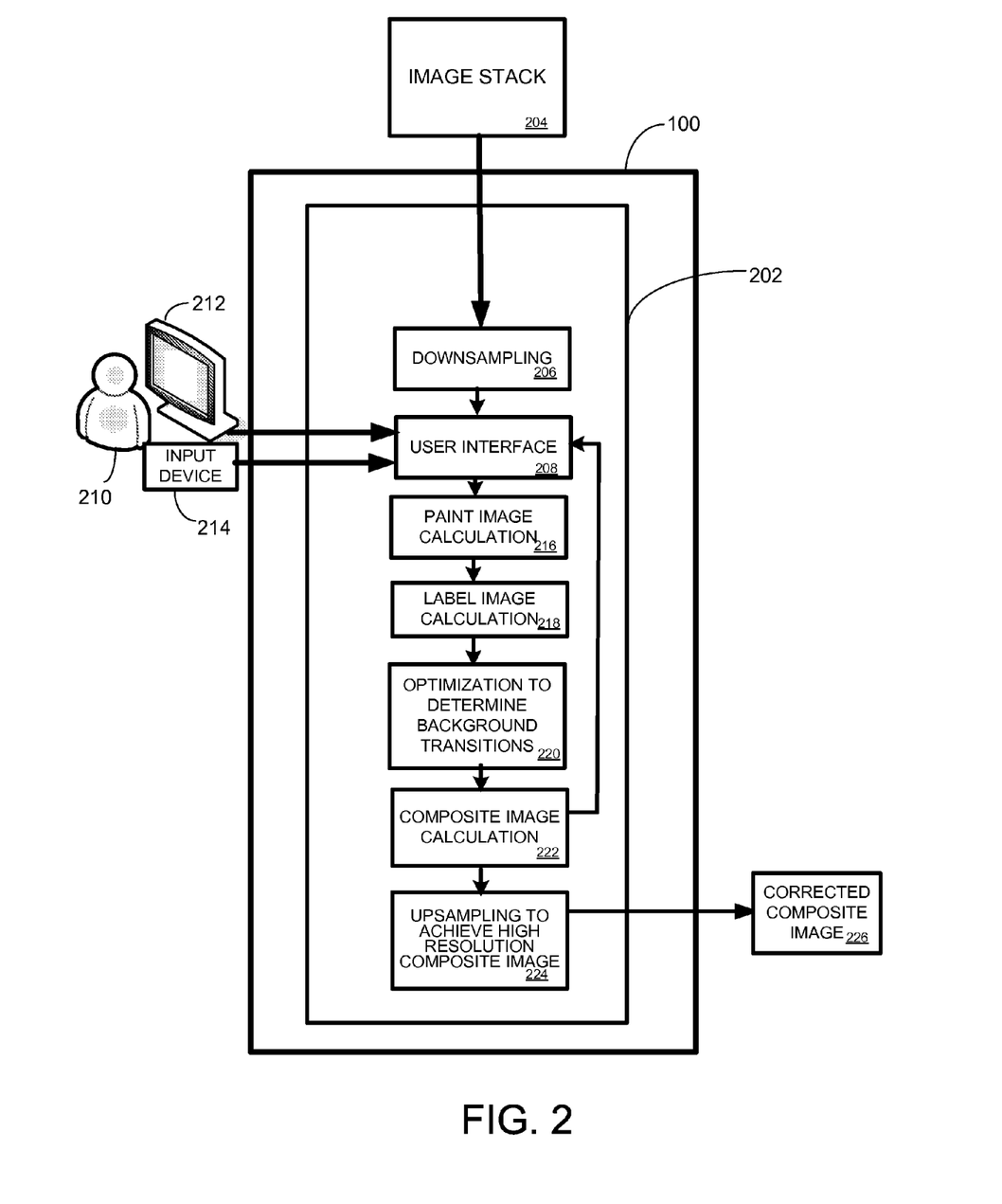
FIG. 2 is a diagram depicting an exemplary architecture for employing the present image region selection technique.

FIG. 2 provides a diagram of one embodiment of the present image region selection architecture. An image compositing module 202 resides on a computing device 100 such as was described previously. An image stack 204, a stack of registered images of generally the same subject matter, is input. The image compositing module 202 includes an image down-sampling module 206 which may be used for down-sampling the images in the image stack for more efficient calculations if desired. The image compositing module 202 also includes a user interface module 208 which allows a user 210 to input a selected region with an input device 214 on a display 212. This region could be a square, an oval, a circle, a rectangle or many other shapes. The user-input region is used in determining the regions which are to be painted to the composite image and are also used to determine the transitions between the source images used to create the composite image. A paint image calculation module 216 is used to create regions where no cuts are to be made in the compositing using the user-selected regions. A label image calculation module 218 creates a label image wherein each pixel is labeled with a pixel from the image stack. The label image is used to create the composite image by using an optimization module 220 to determine where the cuts are to be made in the source images to create the composite image in the composite image calculation module 222. The composite image can be up-sampled in an up-sampling module 224 to output a high resolution composite image 226.

2.3 Image Region Selection Technique.

Figure 3:
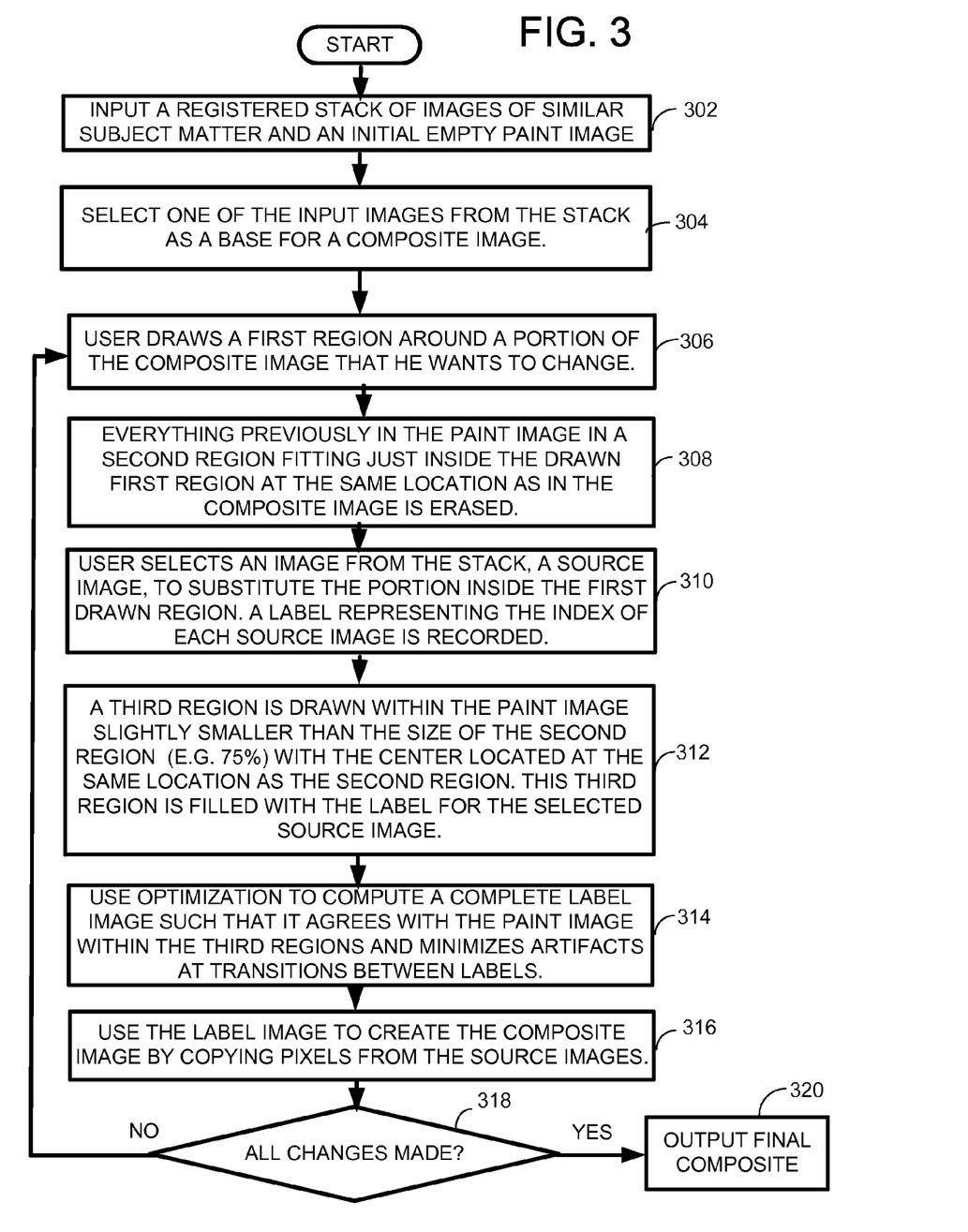
FIG. 3 is a flow diagram depicting the general actions of one embodiment for creating a composite image employing the present image region selection technique.

FIG. 3 provides a general flow diagram of one embodiment of the present image region selection technique. A registered image stack and an initial paint image are input, as shown in action 302. The purpose of the paint image is to specify which regions are not to be cut in the compositing process. A user selects one of the original images from the image stack to serve as a base image of the composite image (action 304). The user then selects a first region of the composite image (the base image if no changes were previously made) that is to be replaced by one of a set of source images from the image stack (action 306). This first region is typically drawn larger than the region that the user really intends to replace. For example, the user may select a whole head of a person, when he really just wants to replace the face of the person. In one embodiment of the present image region selection technique the first region is drawn as a square although other shapes could be used.

A second region in the paint image is then generated fitting just inside the drawn first region. In one embodiment the second region is drawn as an oval. Everything that was previously in the second region of the paint image is erased (action 308). The user selects an image from the image stack, a source image, to substitute a portion of inside the first drawn region. A set of labels wherein each label represents one of the source images (e.g. represents the index of a source image) is recorded (action 310). A third region is then specified in the paint image that is some percentage smaller than the size of the second region (e.g. 75% the size of the second region) with the center of the third region located at the same location as the center of the second region. In the previously mentioned embodiment the third region is also defined by an oval. This third region is filled with the label for the selected source image (action 312).

The optimization procedure is then run to compute a complete label image such that it agrees with the paint image within the third regions and minimizes artifacts at transitions between labels (action 314). This label image is then applied to generate the updated composite image by copying pixels from the source images (action 316). A check is then made to see if the user wants to make any additional changes to the composite image (action 318). If not, the final composite image is output (action 320). If the user desires other changes actions 306 through 316 are repeated until a final composite image is output (actions 318, 320).

Figure 4:
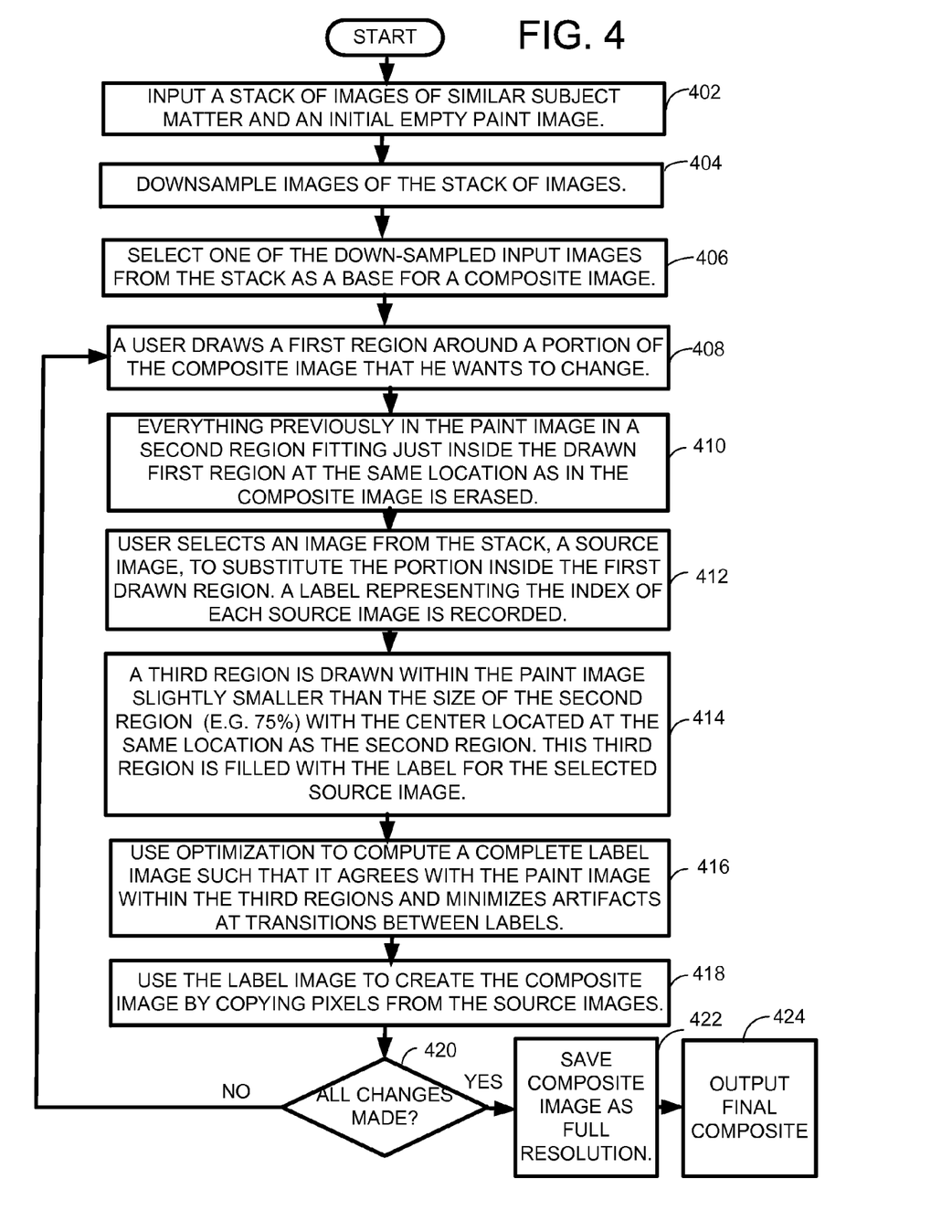
FIG. 4 is a flow diagram depicting the general actions of another embodiment for creating a composite image employing the present image region selection technique.

FIG. 4 provides a general flow diagram of another embodiment of the present image region selection technique. A registered image stack and an initial empty paint image are input into the system, as shown in action 402. The images from the image stack are then down-sampled in order to speed computations (action 404). A user selects one of the down-sampled images from the image stack to serve as a base image for the composite image (action 406). The user then selects a first region of the composite image (the base image if no changes were previously made) that is to be replaced by a region in one of the set of source images from the image stack (action 408).

A second region in the paint image is then generated, fitting just inside the drawn first region. Everything that was previously in the second region of the paint image is erased (action 410). The user selects an image from the image stack, a source image, to substitute a portion of inside the first drawn region. A set of labels wherein each label represents one of the source images (e.g. represents the index of a source image) is recorded (action 412). A third region is specified in the paint image that is some percentage smaller than the size of the second region (e.g. 75% the size of the second region) with the center located at the same location as the center of the second region. The third region is filled with the label for the selected source image (action 414).

The optimization procedure is then run to compute a complete label image such that it agrees with the paint image within the third regions and minimizes artifacts at transitions between labels (action 416). This label image is then applied to generate the updated composite image by copying pixels from the source images (action 418). A check is made to see if the user wants to make any additional changes to the composite image (action 420). If not, the composite image is saved as a full resolution image (action 422) and the final composite image is output (action 424). If the user desires other changes process actions 408 through 420 are repeated until a final composite image up-sampled and is output (actions 422, 424).

2.4 Optimization

The primary technical challenges of photomontage are to choose good seams between parts of the various images so that they can be joined with as few visible artifacts as possible.

In one embodiment a graph cut optimization procedure is used to find the best possible seams along which to cut the various source images. Graph cut provides a clean, flexible formulation for image segmentation. It provides a set of powerful computational mechanisms to extract global segmentation from simple local (pair-wise) pixel similarity. Computationally graph cuts can be very efficient. Graph-cut optimization is used to find the best possible seams along which to cut the various source images in order to create the composite image. In graph cut optimization one must develop appropriate cost functions that will lead to desired optima.

Suppose one has n source images S1, ..., Sn. To form a composite, one must choose a source image Si for each pixel p. The mapping between pixels and source images is called a labeling and the label for each pixel is denoted as L(p). A seam exists between two neighboring pixels p,q in the composite if $L(p) \neq L(q)$.

The graph-cut procedure employed in one embodiment of the image region selection technique uses "alpha expansion" to minimize a cost function. It essentially works as follows. The t'th iteration of the inner loop of the graph cut procedure takes a specific label $\alpha$ and a current labeling $L_t$ as input and computes an optimal labeling $L_{t+1}$ such that $L_{t+1}(p)=L_t(p)$ or $L_{t+1}(p)=\alpha$. The outer loop iterates over each possible label. The procedure terminates when a pass over all labels has occurred that fails to reduce the cost function. If the cost function is a metric, the labeling computed is guaranteed to be within a factor of two of the global minimum.

The cost function C of a pixel labeling L is defined as the sum of two terms: a data penalty $C_d$ over all pixels p and an interaction penalty $C_i$ over all pairs of neighboring pixels p,q:

$$C(L) = \sum_P C_d(p, L(p)) + \sum_{p,q} C_i(p, q, L(p), L(q)) \quad (1)$$

Specifically, in one embodiment, the data penalty $C_d(p, L(p))$ can be defined as a 0 for any label if the corresponding pixel in the paint image is empty, 0 for a label if the corresponding pixel in the paint image matches that label, and infinite if the label in the paint image does not match.

The interaction penalty can be defined to be 0 if $L(p)=L(q)$. Otherwise, it can be defined as:

$C_i(p, q, L(p), L(q))$=X if matching "colors"
　Y if matching "gradients"
　X+Y if matching "colors & gradients"
　X/Z if matching "colors & edges"

where $X=\|S_{L(p)}(p)-S_{L(q)}(p)\|+\|S_{L(p)}(q)-S_{L(q)}(q)\|$ $Y=\|\nabla S_{L(p)}(p)-\|\nabla SL(q)(p)\|+\|\nabla SL(p)(q)-\nabla SL(q)(q)\|$ $Z=E_{L(p)}(p,q)+E_{L(q)}(p,q))$ and $\nabla Sz(p)$ is a 6-component color gradient (in R, G, and B) of image z at pixel p, and Ez(p,q) is the scalar edge potential between two neighboring pixels p and q of image z, computed using a Sobel filter.

It should be noted that although a graph cut methodology was used in one working embodiment of the present image region selection technique, many other conventional types of optimization could be used as will be known to those with ordinary skill in the art. For example, Belief Propagation, Random Walk and other optimization methods could also be used.

3.0 User Interface.

Figure 5:
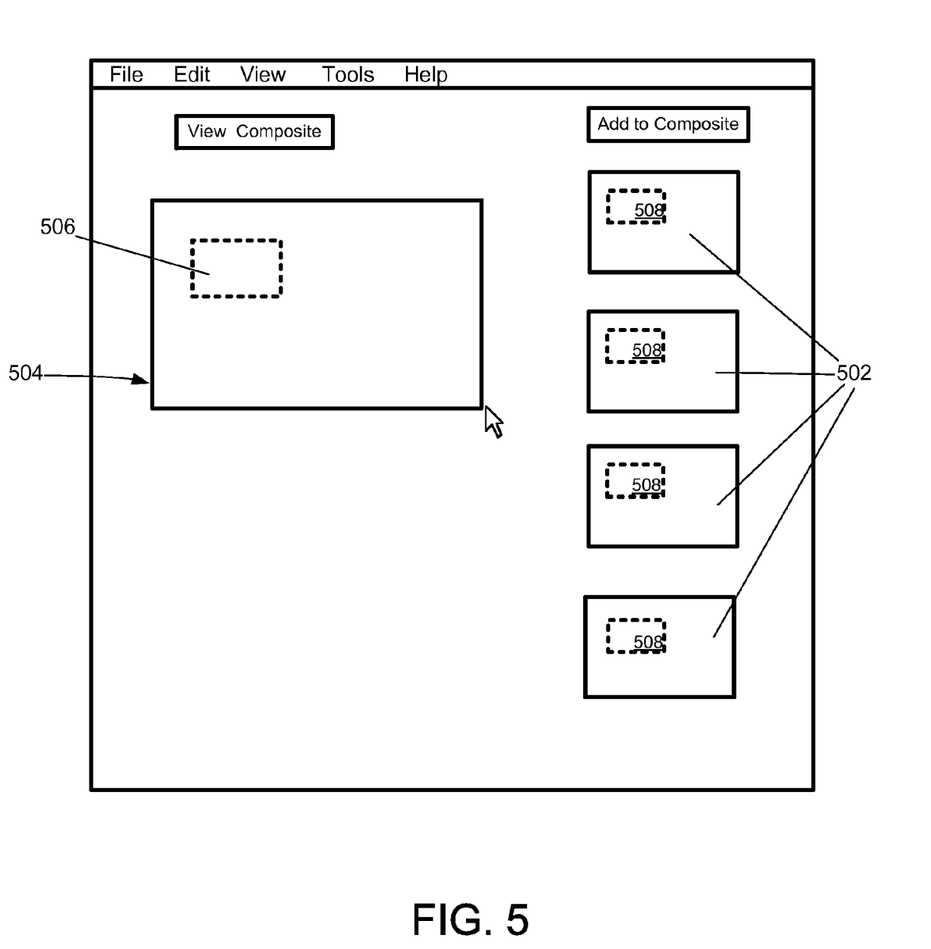
FIG. 5 is a diagram of an exemplary user interface employed in one embodiment of the present image region selection technique.

The user interface (UI) of one exemplary embodiment of the present image region selection technique is designed to easily complete compositing operations using images from the image stack. The user interface makes use of two types of windows: a series of source windows 502, in which the user can scroll through the source images; and a composite window 504, in which the user can see and interact with the current result. New, intermediate results can also be added to the set of source images at any time, in which case they can also be viewed in the source window and selected by the user in the compositing operations.

A user can select a source image, either one of the original images in the image stack or an intermediate image which resulted from a previous editing operation, as a base for the composite image. A region, representing a set of pixels to be replaced, is chosen by the user for a given region in the composite image. A corresponding region is reflected in the source images, one of which will be selected by the user for painting the corresponding region from the chosen source image to the composite image. The present image region selection technique optimizes the selection of pixels around the user-chosen region or regions for cut points that will be least likely to show seams where the source images are merged in the composite image. The user may successively select as many source images as desired to create the final composite image. For example, the user can select the best face for each person in a series of group photos to create a composite group photograph of the best facial expression for each person.

The User Interface (UI) of one exemplary embodiment is designed to easily select the portions of the source image that are to be used in a composite image in the composite window 504. A user selects a region or regions in the composite image to be replaced with the source image pixels by drawing a region 506 with an input device on the composite image displayed on the display. The user then selects the image that he or she wishes to use to replace region 506 in the composite image. When the user selects a region 506 in the composite image 504, for example by dragging a box on that region with an input device, similar regions (e.g.,) in the source images are delineated 508. The user can then select a region from one of the source images and double click or select to add to composite button to add the region 508 to the composite image 504. An inner region of the region the user selects is protected from being cut in the compositing process. The user can chose to output the composite image as a low resolution or a high resolution image.

The foregoing description has been presented for the purposes of illustration and description. It is not intended to be exhaustive. Many modifications and variations are possible in light of the above teaching. It should also be noted that any or all of the aforementioned embodiments throughout the description may be used in any combination desired to form additional hybrid embodiments. It is intended that the scope of the disclosure be limited not by this detailed description, but rather by the claims appended hereto.

Wherefore, what is claimed is:

1. A computer-implemented process for creating a composite image, comprising using a computer to perform the following process actions:
   (a) inputting an image stack comprising a set of original images taken of generally the same subject matter over time and an initial empty paint image;
   (b) selecting one of the images from the image stack as a base for a composite image to create a composite image; and
   (c) drawing a first region around a portion of the composite image that is to be replaced by a portion of a source image and recording a set of labels wherein each label represents one of the source images;
   (d) deleting everything in the paint image in a second region corresponding to and fitting just inside the drawn first region at the same location as in the composite image;
   (e) selecting one of the images from the image stack as a source image to replace the portion of the composite image;
   (f) defining a third region in the paint image slightly smaller than the size of the second region with the center located at the same location as the center of the second region and specifying a label for each of the pixels of this third region with the label for the selected source image;
   (g) using an optimization procedure to compute a complete label image such that the label image agrees with the paint image within the third region and minimizes artifacts at transitions between labels;
   (h) using the label image to create the composite image by copying pixels from the source images by selecting them according to their label;
   (i) if all desired changes are not made, repeating process actions (c) through (h); and
   (j) if all desired changes are made, outputting the composite image as the final composite image.

2. The process of claim 1 wherein the process action of inputting an image stack comprises inputting an image stack wherein the original images are defined in a Cartesian coordinate system and a time.

3. The process of claim 1 wherein the first region is a box drawn by a user.

4. The process of claim 3 wherein the second region is an oval fitting just inside the box.

5. The process of claim 1 wherein the third region is an oval approximately 75% the size of the second region.

6. The process of claim 1 wherein the optimization procedure is a graph cut procedure.

7. The process of claim 1 wherein the subject matter of the base for the composite image is a group of people, and wherein one or more faces of the people in the base for the composite image is replaced by copying pixels of a given person's face from the selected source image into the third region.

8. A computer-readable medium having computer-executable instructions for performing the process recited in claim 1.

9. A system for compositing digital images, the system comprising:
   a general purpose computing device; and
   a computer program comprising program modules executable by the computing device, wherein the computing device is directed by the program modules of the computer program to,
   (a) input a set of original images taken of the approximately same subject matter over a period of time and an initial empty paint image;
   (b) down-sample each of the original images so they are of lower resolution;
   (c) select one of the images as a base for a composite image to create a composite image;
   (d) draw a first region around a portion of the composite image that is to be replaced by a portion of a source image and record a set of labels wherein each label represents one of the source images;
   (e) delete everything in the paint image in a second region fitting just inside the drawn first region at the same location as in the composite image;
   (f) select one of the images from the image stack as a source image to replace the selected first region of the composite image;
   (g) define a third region in the paint image slightly smaller than the size of the second region with the center located at the same location as the center of the second region and fill the third region with labels for the selected source image;
   (h) use an optimization procedure to compute a complete label image such that the label image agrees with the paint image within the third regions and minimizes artifacts at transitions between labels;
   (i) use the label image to create to create the composite image by copying pixels from the source images by selecting them according to their label;
   (j) if all desired changes are not made, repeat process actions (d) through (i); and
   (k) if all desired changes are made, up-sample the composite image so that it is full resolution and output the composite image as the final composite image.

10. The system of claim 9 wherein the first region is a square.

11. The system of claim 9 wherein an edited composite image is used as a source image.

12. The system of claim 9 wherein the optimization procedure is a graph cut procedure wherein a cost function C of a pixel labeling L is defined as the sum of two terms, a data penalty $C_d$ over all pixels p and an interaction penalty $C_i$, over all pairs of neighboring pixels p,q.

13. The system of claim 9 wherein the optimization procedure is a belief propagation procedure.

* * * * *